US010543742B2

(12) United States Patent
Tamura et al.

(10) Patent No.: US 10,543,742 B2
(45) Date of Patent: Jan. 28, 2020

(54) IN-WHEEL MOTOR DRIVE DEVICE

(71) Applicant: NTN CORPORATION, Osaka (JP)

(72) Inventors: Shiro Tamura, Shizuoka (JP); Minoru Suzuki, Shizuoka (JP); Shinya Taikou, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/343,449

(22) PCT Filed: Nov. 16, 2016

(86) PCT No.: PCT/JP2016/083885
§ 371 (c)(1),
(2) Date: Apr. 19, 2019

(87) PCT Pub. No.: WO2018/083808
PCT Pub. Date: May 11, 2018

(65) Prior Publication Data
US 2019/0241059 A1    Aug. 8, 2019

(30) Foreign Application Priority Data

Nov. 1, 2016  (JP) .............................. 2016-214380

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/043* (2013.01); *F16H 1/06* (2013.01);
(Continued)

(58) Field of Classification Search
CPC .... B60K 7/0007; B60K 17/043; B60K 17/14; B60K 7/00; B60K 2007/0061; F16H 1/06; H02K 21/14
See application file for complete search history.

(56) References Cited

U.S. PATENT DOCUMENTS 5,691,584 A    11/1997  Toida et al.
8,100,027 B2 *  1/2012  Sato ...................... B24B 31/003
                                                        74/434
(Continued)

FOREIGN PATENT DOCUMENTS

| JP | 7-81436 | 3/1995 |
|---|---|---|
| JP | 2012-214202 | 11/2012 |
| JP | 2015-214273 | 12/2015 |

OTHER PUBLICATIONS

International Preliminary Report on Patentability and Written Opinion of the International Searching Authority dated May 7, 2019 in International (PCT) Application No. PCT/JP2016/083885.
(Continued)

*Primary Examiner* — John D Walters
*Assistant Examiner* — James J Triggs
(74) *Attorney, Agent, or Firm* — Wenderoth, Lind & Ponack, L.L.P.

(57) ABSTRACT

A large gear and a small gear are provided to an intermediate shaft of an in-wheel motor drive device, and a final output gear configured to mesh with the small gear of the intermediate shaft is provided to an output shaft. The output shaft is supported by bearings on in-board and out-board sides, respectively, and the large gear of the intermediate shaft is arranged between the bearing configured to support the output shaft on the in-board side and the final output gear of the output shaft. The bearing and the large gear are arranged so that, when viewed from the axial direction, a tooth top circle of the large gear of the intermediate shaft and a
(Continued)

radially outer circle of the bearing configured to support the output shaft on the in-board side have an intersection point.

2 Claims, 6 Drawing Sheets

(51) Int. Cl.
*F16H 1/06* (2006.01)
*H02K 7/08* (2006.01)
*H02K 7/116* (2006.01)
*H02K 21/12* (2006.01)
*H02K 7/00* (2006.01)

(52) U.S. Cl.
CPC ............. *H02K 7/006* (2013.01); *H02K 7/083* (2013.01); *H02K 7/116* (2013.01); *H02K 21/12* (2013.01); *B60K 2007/0061* (2013.01)

(56) References Cited

U.S. PATENT DOCUMENTS

| | | | | |
|---|---|---|---|---|
| 8,101,031 B2* | 1/2012 | Sakurai | ....................... | B21J 5/12 |
| | | | | 148/570 |
| 9,931,888 B2* | 4/2018 | Hirano | .................... | F16D 1/076 |
| 2012/0248850 A1 | 10/2012 | Hirano | | |
| 2015/0033894 A1* | 2/2015 | Okuno | .................... | B22F 3/168 |
| | | | | 74/434 |

OTHER PUBLICATIONS

International Search Report dated Dec. 13, 2016 in International (PCT) Application No. PCT/JP2016/083885.

\* cited by examiner

IN-WHEEL MOTOR DRIVE DEVICE

TECHNICAL FIELD

The present invention relates to an in-wheel motor drive device, in which, for example, an electric motor and a wheel bearing are connected to each other via a speed reducer.

BACKGROUND ART

As an in-wheel motor drive device is mounted inside a wheel, and hence increase in weight of the drive device causes increase in unsprung load of a vehicle. The increase in unsprung load causes degradation in traveling stability and NVH characteristics. Consequently, downsizing and lightweighting of the drive device are important. Output torque of an electric motor is proportional to a size and a weight of the motor. Thus, in order to generate torque which is required for drive of the vehicle solely by the motor, a motor having a large size is required. Therefore, in the in-wheel motor drive device, rotation of the electric motor is transmitted to the wheel via a speed reduction mechanism, to thereby achieve the downsizing of the motor.

Incidentally, as disclosed in, for example, Patent Literature 1 (Japanese Patent Application Laid-open No. 2015-214273), an in-wheel motor drive device arranged in a wheel of a vehicle is connected to a suspension device such as a lower arm. For that reason, it is required that an installation space for the suspension device, in addition to the installation space for the in-wheel motor drive device, be secured in the wheel of the vehicle. Moreover, although not shown in the drawings, a brake caliper is also arranged in the wheel, and hence it is also required that an installation space for the brake caliper be secured. Thus, it is desired that a radial dimension of the in-wheel motor drive device be set as small as possible.

Even when the dimension in the radial direction is reduced while sacrificing a dimension in an axial direction (vehicle width direction) to meet such demands, an increase in axial dimension causes increase in protruding amount of the in-wheel motor drive device from the wheel toward an in-board side. As a result, there is a fear in that a vehicle body and the in-wheel motor drive device interfere with each other at the time of steering or vertical movement of the vehicle.

As one example of a structure having reduced in dimensions of the in-wheel motor drive device in the axial direction and the radial direction, for example, in Patent Literature 2 (Japanese Patent Application Laid-open No. 2012-214202), there is disclosed a method of arranging a speed reducer coaxially with a wheel center and arranging the speed reducer and a motor on the same section in the radial direction.

CITATION LIST

Patent Literature 1: JP 2015-214273 A
Patent Literature 2: JP 2012-214202 A

SUMMARY OF INVENTION

Technical Problem

In Patent Literature 2, output of a motor is transmitted to a speed reducer (planetary gear), which is arranged on a radially outer side of the motor, via an idler gear. Therefore, even when the in-wheel motor drive device can be downsized, the number of components increases by the number corresponding to the idler gear. As a result, it is conceivable that the NVH characteristics are degraded. As described above, when the downsizing of the in-wheel motor drive device is to be considered, another new problem generally arises as a trade-off. Thus, sufficient studies are required so as to minimize the influence of the new problem.

Based on the verification described above, the present invention has an object to reduce a dimension of an in-wheel motor drive device in the radial direction.

Solution to Problem

According to one embodiment of the present invention, which has been devised to achieve the above-mentioned object, there is provided an in-wheel motor drive device, comprising: an electric motor section; a wheel bearing section; and a speed reducer section, which is formed of a parallel shaft gear mechanism comprising an input shaft, an intermediate shaft, and an output shaft, and is configured to transmit output torque of the electric motor section, which is input to the input shaft, to the wheel bearing section via the intermediate shaft and the output shaft, the intermediate shaft comprising a large gear and a small gear, the output shaft comprising a final output gear configured to mesh with the small gear of the intermediate shaft, the output shaft being supported on its in-board side and out-board side by bearings, respectively, wherein the large gear of the intermediate shaft is arranged between the bearing configured to support the output shaft on the in-board side and the final output gear of the output shaft, and wherein, when viewed from the axial direction, a tooth top circle of the large gear of the intermediate shaft and a radially outer circle of the bearing configured to support the output shaft on the in-board side have an intersection point.

With the configuration described above, the large gear of the intermediate shaft can be increased in radial dimension. Thus, the gears can be efficiently accommodated in a space inside a case while securing a required speed reduction ratio. As a result, the in-wheel motor drive device can be reduced in radial dimension. Through employment of the configuration described above, there is a case in which assembly workability of the in-wheel motor drive device is degraded. However, such a problem can easily be eliminated by countermeasures such as contriving a jig. Besides, such a problem does not adversely affect a function or a performance of the in-wheel motor drive device.

In addition, the in-wheel motor drive device is desired to be configured such that the intermediate shaft is supported on its in-board side and out-board side by bearings, respectively, the final output gear is arranged between the bearing configured to support the intermediate shaft on the out-board side and the large gear of the intermediate shaft, and that, when viewed from the axial direction, the tooth top circle of the final output gear of the output shaft and the radially outer circle of the bearing configured to support the intermediate shaft on the out-board side have an intersection point. With this, the final output gear can be increased in radial dimension, thereby being capable of obtaining an effect similar to the effect described above.

Advantageous Effects of Invention

According to the present invention, the in-wheel motor drive device can be reduced in dimension in the radial direction. As a result, a sufficient accommodation space for the suspension arm and the brake caliper can be secured in the wheel. Thus, when the in-wheel motor drive device is to be mounted to, for example, electric vehicles there can be used existing suspension devices and braking devices, thereby being capable of reducing development costs.

DESCRIPTION OF EMBODIMENTS

An in-wheel motor drive device according to one embodiment of the present invention is described in detail with reference to the drawings.

Figure 6:
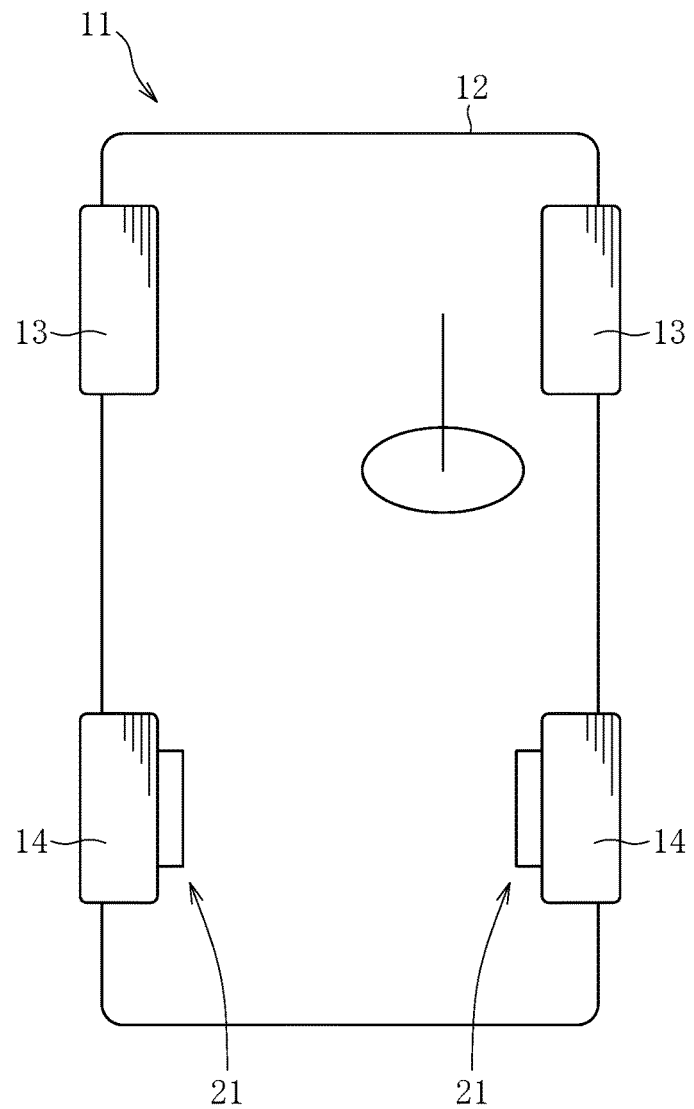
FIG. 6 is a plan view for illustrating a schematic configuration of an electric vehicle on which in-wheel motor drive devices are mounted.
Figure 7:
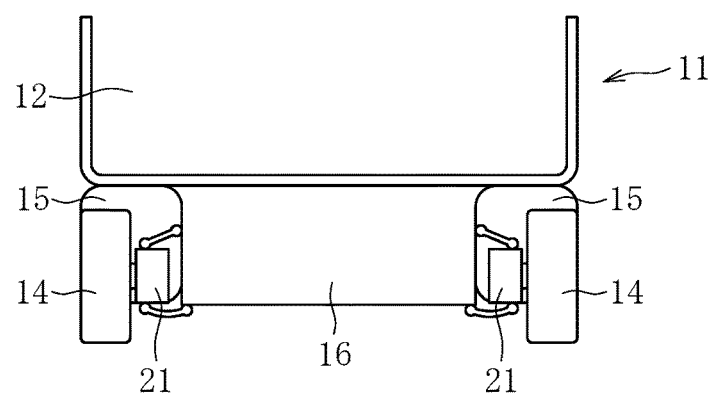
FIG. 7 is a rear sectional view of the electric vehicle of FIG. 6.

FIG. 6 is a schematic plan view of an electric vehicle 11 on which in-wheel motor drive devices 21 are mounted, and FIG. 7 is a schematic sectional view of the electric vehicle 11, when viewed from a rear side.

As illustrated in FIG. 6, an electric vehicle 11 comprises a chassis 12, front wheels 13 serving as steered wheels, rear wheels 14 serving as driving wheels, and in-wheel motor drive devices 21 configured to transmit driving force to the rear wheels 14. As illustrated in FIG. 7, each of the rear wheel 14 is accommodated inside a wheel housing 15 of the chassis 12 and fixed below the chassis 12 via a suspension device (suspension) 16.

In the suspension device 16, horizontally extending suspension arms are configured to support the rear wheels 14, and a strut comprising a coil spring and a shock absorber is configured to absorb vibrations that each of the rear wheel 14 receives from the ground to suppress the vibrations of the chassis 12. In addition, a stabilizer configured to suppress tilting of a vehicle body during turning and other operations is provided at the connecting portions of the right and left suspension arms. In order to improve a followability of following irregularities of a road surface to transmit the driving force of the rear wheels 14 to the road surface efficiently, the suspension device 16 is an independent suspension type capable of independently moving the right and left wheels up and down.

The electric vehicle 11 does not need to comprise a motor, a drive shaft, a differential gear mechanism, and other components on the chassis 12 because the in-wheel motor drive devices 21 configured to drive the right and left rear wheels 14, respectively, are arranged inside the wheel housings 15. Accordingly, the electric vehicle 11 has advantages in that a large passenger compartment space can be provided and that rotation of the right and left rear wheels 14 can be controlled, respectively.

Prior to discuss a characteristic configuration of this embodiment, an overall configuration of the in-wheel motor drive device 21 is described with reference to FIG. 1 to FIG. 3. In the following description, under a state in which the in-wheel motor drive device 21 is mounted to the vehicle, a side closer to an outer side of the vehicle in a vehicle width direction is referred to as "out-board side", and a side closer to a center of the vehicle body is referred to as "in-board side".

Figure 1:
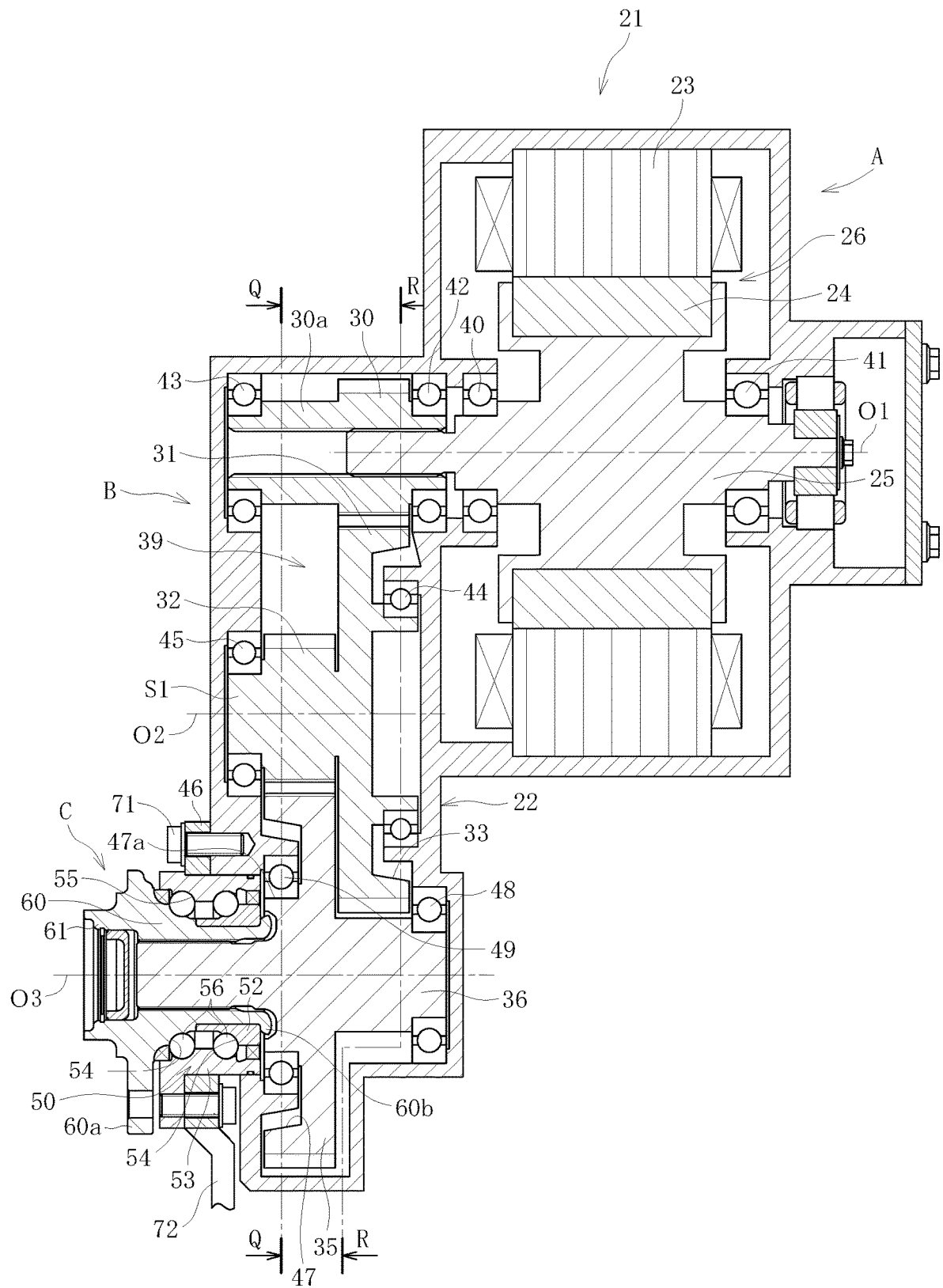
FIG. 1 is a longitudinal sectional view of an in-wheel motor drive device taken along the line P-P of FIG. 2, when viewed from the direction indicated by the arrows.
Figure 2:
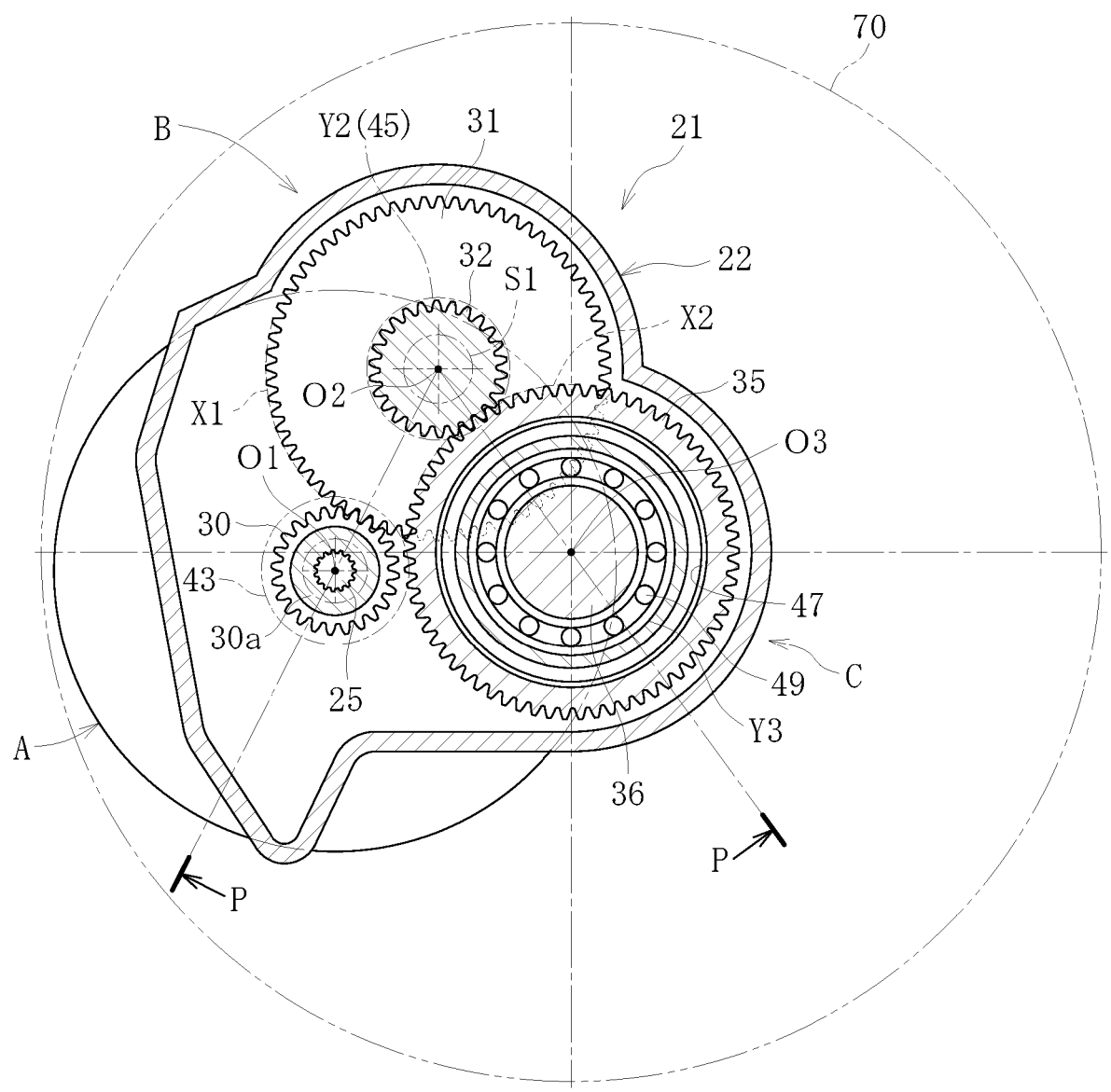
FIG. 2 is a transverse sectional view of the in-wheel motor drive device taken along the line Q-Q of FIG. 1, when viewed from the direction indicated by the arrows.

FIG. 1 is a longitudinal sectional view of the in-wheel motor drive device taken along the line P-P of FIG. 2, when viewed from the direction indicated by the arrows. FIG. 2 is a transverse sectional view of the in-wheel motor drive device taken along the line Q-Q of FIG. 1, when viewed from the direction indicated by the arrows. FIG. 3 is a transverse sectional view taken along the line R-R of FIG. 1, when viewed from the direction indicated by the arrows.

As illustrated in FIG. 1, the in-wheel motor drive device 21 comprises a motor section A configured to generate driving force, the speed reducer section B configured to reduce a speed of rotation of the motor section A to output the rotation, and a wheel bearing section C configured to transmit the output from the speed reducer section B to the rear wheels 14 serving as driving wheels. The electric motor section A, the speed reducer section B, and the wheel bearing section C are each accommodated in a casing 22. The casing 22 has a dividable structure (see FIG. 5) in consideration of workability at the time of assembling the electric motor section A, the speed reducer section B, or the wheel bearing section C.

The electric motor section A is an electric motor 26 of a radial gap type, comprising a stator 23 fixed to the casing 22, a rotor 24 arranged on a radially inner side of the stator 23 at an opposed position with a gap, and a motor rotation shaft 25, which is arranged on a radially inner side of the rotor 24 so as to rotate integrally with the rotor 24. The motor rotation shaft 25 is rotatable at high speed about ten and several thousand rotations per minute. The stator 23 is formed by winding a coil around a magnetic core, and the rotor 24 is formed of permanent magnets, etc.

The motor rotation shaft 25 is supported at its end portion on one side in the axial direction (left side in FIG. 1) by a rolling bearing 40, and is supported at its end portion on another side in the axial direction (right side in FIG. 1) by a rolling bearing 41 so as to be freely rotatable with respect to the casing 22.

The speed reducer section B comprises an input gear 30, an input-side intermediate gear 31 (large gear) and an output-side intermediate gear 32 (small gear), which are intermediate gears, and a final output gear 35. The input gear 30 is formed integrally with an input shaft 30a, and the input shaft 30a is coaxially connected to the motor rotation shaft 25 by spline fitting (including serration fitting, and the same holds true in the following description). An intermediate shaft S1 comprising the input-side intermediate gear 31 and the output-side intermediate gear 32 is formed integrally with the intermediate gears 31 and 32. An output shaft 36 comprising the final output gear 35 is formed integrally with the final output gear 35. Any one or two of more among the gears 30, 31, 32, and 35 may be formed separately from corresponding one of the shafts so as to be connected to the corresponding one of the shafts by, for example, spline fitting.

The input shaft 30a, the intermediate shaft S1, and the output shaft 36 are arranged in parallel with one another. The rolling bearings 42 and 43 are arranged on both sides of the input gear 30 of the input shaft 30a in the axial direction, and the input shaft 30a is supported by the rolling bearings 42 and 43 so as to be freely rotatable with respect to the casing 22. Under a state in which the input-side intermediate gear 31 is arranged on the in-board side, and the output-side intermediate gear 32 is arranged on the out-board side, the intermediate shaft S1 is supported by two rolling bearings 44 and 45 so as to be freely rotatable with respect to the casing 22. Moreover, rolling bearings 48 and 49 are arranged on both sides of the final output gear 35 of the output shaft 36 in the axial direction, and the output shaft 36 is supported by the rolling bearings 48 and 49 so as to be freely rotatable with respect to the casing 22. As each of the rolling bearings 40 to 45, 48, and 49 described above, there is used a bearing capable of receiving both a radial load and a thrust load, for example, a deep-groove ball bearing.

With regard to the bearings 44 and 45 configured to support the intermediate shaft S1 on the in-board side and the out-board side, the rolling bearing 44 provided on the input-side intermediate gear 31 side being the in-board side has a diameter larger than that of the rolling bearing 45 provided on another side. The rolling bearing 44 provided on the in-board side has an inner-diameter dimension larger than an outer-diameter dimension of the rolling bearing 45 on the out-board side. Moreover, with regard to the bearings 48 and 49 configured to support the output shaft 36 on the in-board side and the out-board side, the rolling bearing 49 provided on the final output gear 35 side being the out-board side has a diameter larger than that of the rolling bearing 48 provided on another side. The rolling bearing 49 provided on the out-board side has an inner-diameter dimension smaller than an outer-diameter dimension of the rolling bearing 48 provided on the in-board side. The rolling bearing 49 provided on the out-board side has an outer-diameter dimension larger than an outer-diameter dimension of an outer ring 53, which is described later, of the wheel bearing section C.

Figure 3:
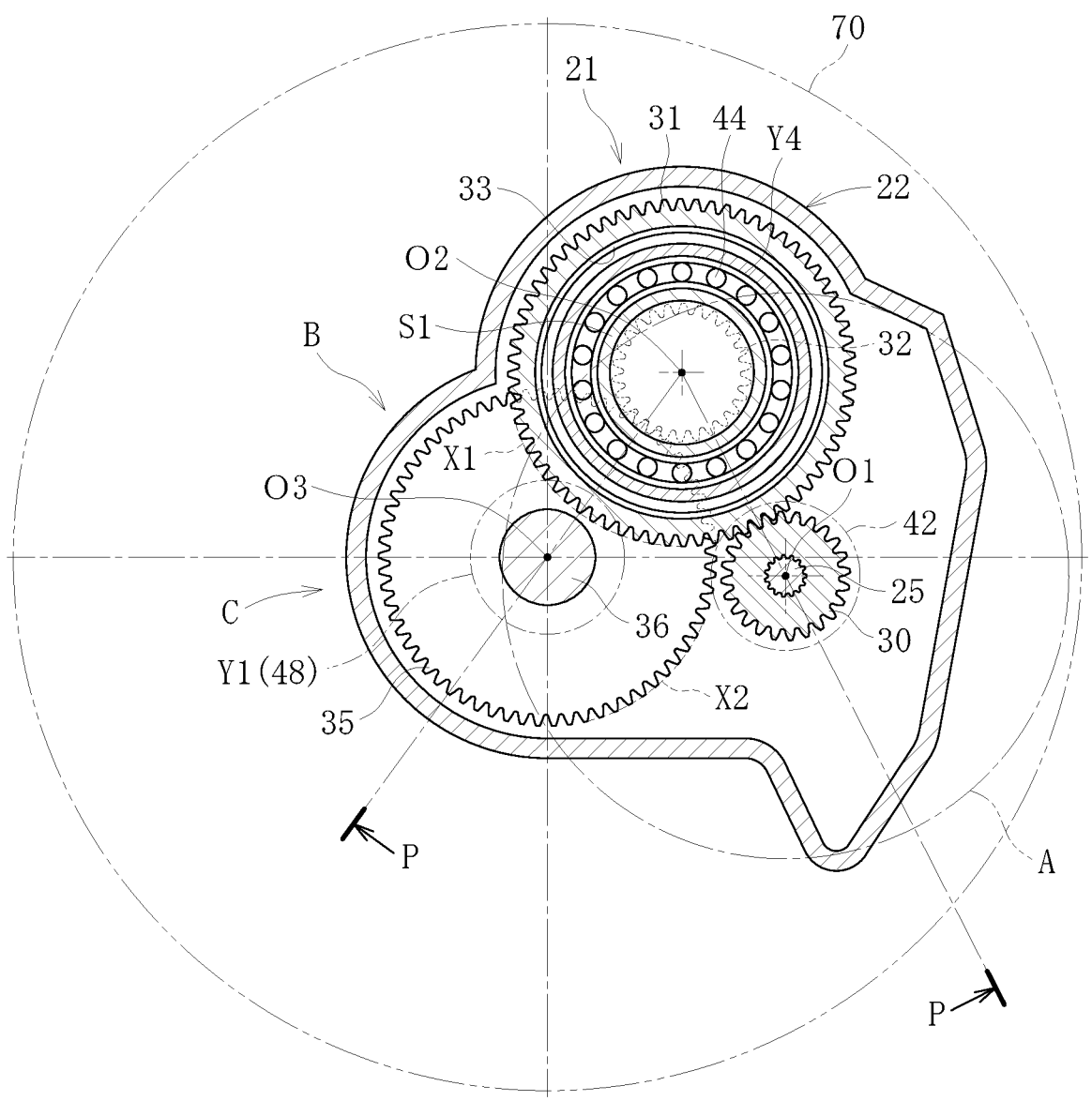
FIG. 3 is a transverse sectional view of the in-wheel motor drive device taken along the line R-R of FIG. 1, when viewed from the direction indicated by the arrows.

As illustrated in FIG. 2 and FIG. 3, a center O2 of the intermediate shaft S1 is arranged between a center O1 of the input shaft 30a (which is also a center of the motor rotation shaft 25) of the speed reducer section B and a center O3 of the wheel bearing section C. The centers O1, O2, and O3 each are arranged so that lines connecting the centers O1, O2, and O3 forma triangle, thereby achieving downsizing of an outer contour of the in-wheel motor drive device 21. With this, the in-wheel motor drive device 21 can be mounted in a rear wheel 70 of an existing internal combustion engine. An outer-diameter dimension (indicated by the one-dot chain line in FIG. 3) of the electric motor section A is set so that, when viewed from the axial direction, the electric motor section A is superimposed with the rolling bearing 48 configured to support the output shaft 36 on the out-board side.

FIG. 2 is a transverse sectional view taken along the line Q-Q of FIG. 1, when viewed from the direction indicated by the arrows, that is, viewed from the out-board side. The rolling bearing 49 configured to support the output shaft 36 on the out-board side is arranged in a radially-inner-side recess portion 47 of the final output gear 35. The rolling bearing 49 configured to support the output shaft 36 on the out-board side and the rolling bearing 45 configured to support the intermediate shaft S1 on the out-board side are arranged so that respective bearing widths are prevented from being superimposed with each other in the axial direction. Moreover, FIG. 3 is a transverse sectional view taken along the line R-R of FIG. 1, when viewed from the direction indicted by the arrows, that is, viewed from the in-board side. The rolling bearing 44 configured to support the intermediate shaft S1 on the in-board side is arranged in a radially-inner-side recess portion 33 of the input-side intermediate gear 31.

As illustrated in FIG. 1, in the speed reducer section B, the input gear 30 and the input-side intermediate gear 31 mesh with each other, and the output-side intermediate gear 32 and the final output gear 35 mesh with each other. The number of teeth of the input-side intermediate gear 31 is larger than the number of teeth of each of the input gear 30 and the output-side intermediate gear 32, and the number of teeth of the final output gear 35 is larger than the number of teeth of the output-side intermediate gear 32. With the configuration described above, a parallel shaft gear speed reducer 39 configured to reduce a speed of the rotary motion of the motor rotation shaft 25 in two stages is thus configured.

In this embodiment, helical gears are used as the input gear 30, the input-side intermediate gear 31, the output-side intermediate gear 32, and the final output gear 35 forming the parallel shaft gear speed reducer 39. With the helical gears, the number of teeth which are simultaneously in mesh becomes larger, and teeth contact is dispersed. Therefore, the helical gears are effective in quietness and less torque fluctuation. In consideration of a meshing ratio and a limit rotation number of the gears, it is preferred that modules of the gears be set to from 1 to 3.

The wheel bearing section C is formed of a wheel bearing 50 of an inner-ring rotation type. The wheel bearing 50 is a double-row angular ball bearing mainly comprising an inner member 61, the outer ring 53, balls 56, and a retainer (not shown). The inner member 61 comprises a hub ring 60 and an inner ring 52. The hub ring 60 comprises a flange portion 60a for mounting a wheel, which is formed on an outer periphery of the hub ring 60 on the out-board side. The inner ring 52 is fitted to a small-diameter step portion of the hub ring 60 on the in-board side. After that, an in-board-side end portion of the hub ring 60 is caulked. The caulked portion 60b is configured to, after assembly of the wheel bearing 50, position the inner ring 52 in the axial direction and apply a preload on the wheel bearing 50. An inner raceway surface 54 on the out-board side is formed on an outer periphery of the hub ring 60, and an inner raceway surface 54 on the in-board side is formed on an outer periphery of the inner ring 52. Although not shown, a brake disc and a wheel are mounted to the flange portion 60a for mounting a wheel.

Double-row outer raceway surfaces 55 are formed on an inner periphery of the outer ring 53 so as to correspond to the inner raceway surface 54 of the hub ring 60 and the inner raceway surface 54 of the inner ring 52. A flange portion is formed on an outer periphery of the outer ring 53. The flange portion is fastened and fixed to the casing 22 by a bolt 71 through intermediation of an attachment 46. Moreover, the outer ring 53 is fastened and fixed by a bolt to a mounting portion 72 for mounting to the suspension device. The output shaft 36 is fitted to the inner periphery of the hub ring 60 by spline fitting so as to be connected to the hub ring 60 in a torque-transmittable manner.

In the in-wheel motor drive device 21, for cooling of the electric motor 26 and for lubrication and cooling of the speed reducer 39, lubricating oil is fed to relevant portions by a rotary pump (not shown). The inside of the wheel bearing 50 is lubricated by grease.

The in-wheel motor drive device 21 is accommodated inside the wheel housing 15 (see FIG. 7), and thus becomes unsprung load. Therefore, downsizing and reduction in weight thereof are required. Thus, through combination of the parallel shaft gear speed reducer 39 having the above-mentioned configuration and the motor 28, the small-sized motor 26 with low torque and high-speed rotation can be used. For example, in a case in which the parallel shaft gear speed reducer 39 having a speed reduction ratio of 11 is used, through employment of the electric motor 26 with high-speed rotation about ten and several thousand rotations per minute, the downsizing of the electric motor 26 can be achieved. With this downsizing, the compact in-wheel motor drive device 21 can be achieved. As a result, the unsprung weight is suppressed, thereby being capable of obtaining the electric vehicle 11 which is excellent in traveling stability and NVH characteristics.

The overall configuration of the in-wheel motor drive device 21 according to this embodiment is as described above. Characteristic configurations are described below.

As illustrated in FIG. 1, in the in-wheel motor drive device 21 according to this embodiment, the input-side gear 31 (large gear) of the intermediate shaft S1 is arranged between the rolling bearing 48, which is arranged on the in-board side of the output shaft 36, and the final output gear 35 of the output shaft 36. Moreover, when viewed from the axial direction, as illustrated in FIG. 3, a tooth top circle X1 of the input-side intermediate gear 31 of the intermediate shaft S1 and a radially outer circle (indicated by one-dot chain line) of the bearing 48 configured to support the output shaft 36 on the in-board side have two intersection points.

In addition, the final output gear 35 of the output shaft 36 is arranged between the rolling bearing 45 configured to support the intermediate shaft S1 on the out-board side and the input-side intermediate gear (large gear) 31 of the intermediate shaft S1. When viewed from the axial direction, as illustrated in FIG. 2, a tooth top circle X2 of the final output gear 35 and a radially outer circle Y2 (indicated by one-dot chain line) of the bearing 45 configured to support the intermediate shaft S1 on the out-board side have two intersection points.

As illustrated in FIG. 2, when viewed from the axial direction, the tooth top circle X1 of the input-side intermediate gear 31 of the intermediate shaft S1 and a radially outer circle Y3 of the bearing 49 configured to support the output shaft 36 on the out-board side also have two intersection points. Moreover, as illustrated in FIG. 3, when viewed from the axial direction, the tooth top circle X2 of the final output gear and a radially outer circle Y4 of the bearing 44 configured to support the intermediate shaft S1 on the in-board side also have two intersection points.

The "radially outer circles" of the bearings described above correspond to circles which are depicted when outer peripheral surfaces 45a and 48b of the outer rings being elements of the rolling bearings 45 and 48 are viewed from the axial direction.

Bearing sizes of the rolling bearings 42 to 45, 48, and 49 used for supporting the input shaft 30a, the intermediate shaft S1, and the output shaft 36 are determined based on magnitudes of torque to be transmitted by the shafts 30a, S1, and 36 and maximum loads (radial load and thrust load) which act on the bearings. Thus, outer-diameter dimensions of the rolling bearings 42 to 45, 48, and 49 are also determined based on torque and loads in a similar manner. Therefore, as illustrated in FIG. 3, when the tooth top circle X1 of the input-side intermediate gear 31 and the radially outer circle Y1 of the bearing 48 configured to support the output shaft 36 on the in-board side are brought into a state of intersecting each other when viewed from the axial direction, a radial dimension of the entirety of the in-wheel motor drive device 21 can be reduced while securing a speed reduction ratio required for the speed reducer 39.

Figure 4:
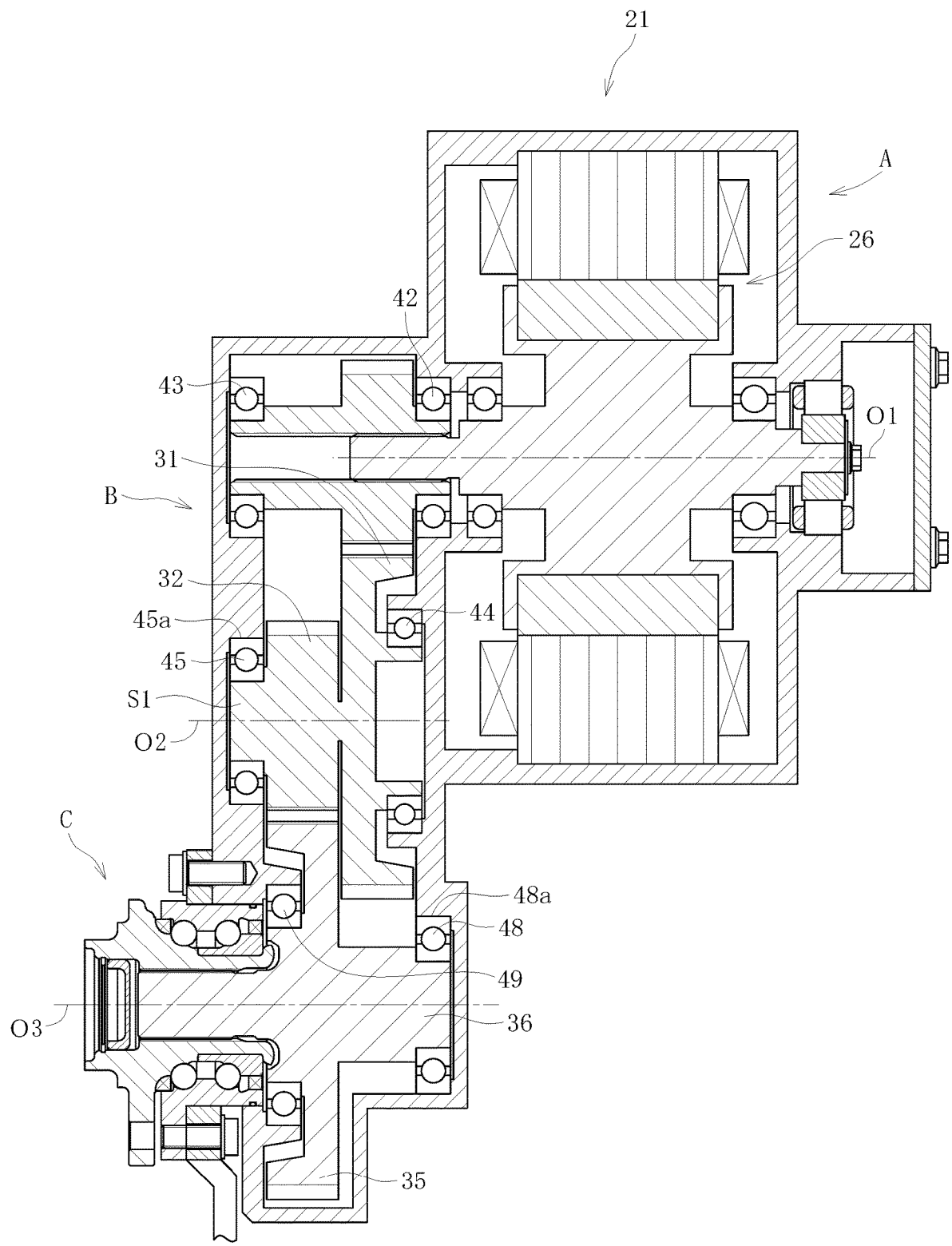
FIG. 4 is a longitudinal sectional view for illustrating an in-wheel motor drive device as a comparative example.

For description of the effect described above, as a comparative example, assumption is made of a configuration in which, as illustrated in FIG. 4, the tooth top circle of the input-side intermediate gear 31 of the intermediate shaft S1 and the radially outer circle of the bearing 48 configured to support the output shaft 36 on the in-board side have no intersection point. In this case, a radial dimension of the input-side intermediate gear 31 being the large gear is reduced. Thus, when positions of the centers O1, O2, and O3 of the shafts are not changed, it is required that the radial dimension of the input gear 30 of the input shaft 30a be increased for meshing. As a result, a speed reduction ratio required for the entirety of the speed reducer 39 cannot be obtained. In order to obtain an appropriate speed reduction ratio, it is required that respective inter-axis distances (between O1 and O2 and between O2 and O3) be increased. As a result, a radial dimension of the in-wheel motor drive device 21 increases. Such tendency is more conspicuous in the configuration in which, as illustrated in FIG. 4, the tooth top circle of the final output gear 35 and the radially outer surface of the bearing 45 configured to support the intermediate shaft S1 on the out-board side do not have the intersection point.

In contrast, with the configuration of FIG. 1, a radial dimension of the input-side intermediate gear 31 increases. Thus, each of the gears can be efficiently accommodated in the space inside the case 22 while securing the required speed reduction ratio. Thus, the radial dimension of the in-wheel motor drive device 21 can be reduced. With this, a sufficient accommodation space for the suspension arms and the brake caliper can be secured in the wheel 70. Accordingly, when the in-wheel motor drive device 21 is to be mounted to the electric vehicle 11, existing suspension devices or existing braking devices can be used, thereby being capable of reducing the development costs. In the description above, illustration is given of the case in which the two circles intersect at the two intersection points. However, the number of the intersection point of the two circles may be one (state in which two circles are in tangent with each other).

Figure 5:
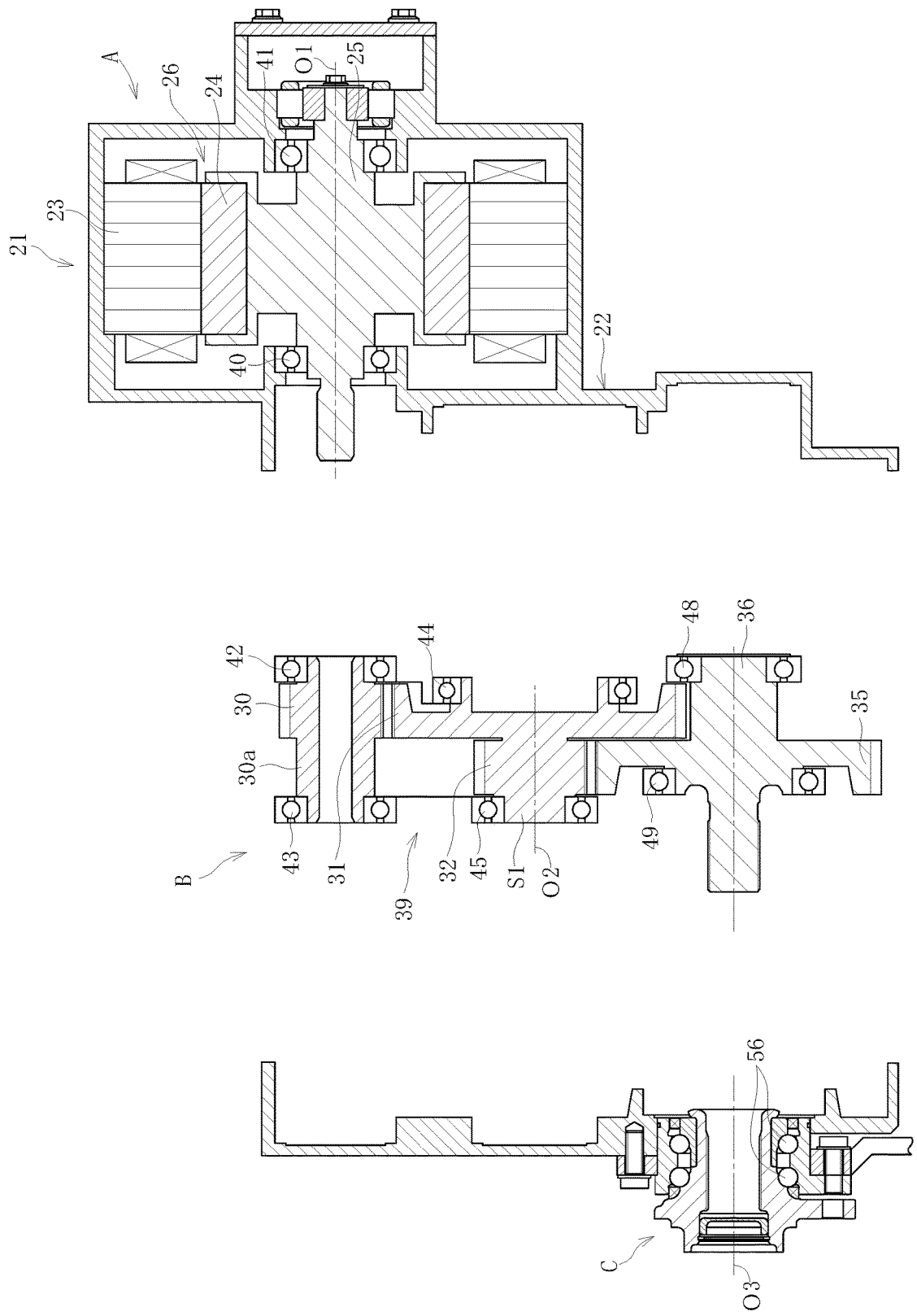
FIG. 5 is a longitudinal sectional view for illustrating an assembly state of the in-wheel motor drive device.

At the time of assembly of the parallel shaft speed reducer 39 described above, the input shaft 30a, the intermediate shaft S1, and the output shaft 36 are incorporated into the casing 22 under a state in which, for prevention of creep, the rolling bearings 42 to 45, 48, and 49 are press-fitted in advance to respective outer peripheral surfaces of the shafts on the rotation side (see FIG. 5). As in the comparative example illustrated in FIG. 4, when there is given a configuration in which, when viewed from the axial direction, the tooth top circle of the input-side intermediate gear 31 and the radially outer circle of the bearing 48 do not have the intersection points and the tooth top circle of the final output gear 35 and the radially outer surface of the bearing 45 do not have the intersection points, the shafts 30a, S1, and 36 each integrally comprising the gear can be sequentially incorporated into the casing 22 in the order of the input shaft 30a, the intermediate shaft S1, and the output shaft 36. In contrast, with the configuration illustrated in FIG. 1, after the input shaft 30a and the intermediate shaft S1 are incorporated into the casing 22, the bearing 45 and the final output gear 35 interfere with each other, and the bearing 48 and the input-side intermediate gear 31 interfere with each other, with the result that the output shaft 36 cannot be incorporated into the casing 22.

In consideration of this point, assembly in the case in which the parallel shaft speed reducer 39 having the configuration illustrated in FIG. 1 is adopted can be performed by holding the input shaft 30a, the intermediate shaft S1, and the output shaft 36 of the parallel shaft speed reducer 39 in a state of an assembly with respective gears in mesh with each other and simultaneously incorporating the assembly into the casing 22. At the time of mass production of the in-wheel motor drive device 21, the parallel shaft speed reducer 39 can be assembled to the casing 22 without any particular inconvenience through use of a jig for holding the three shafts 30a, S1, and 36 in the state of the assembly.

In a general parallel shaft speed reducer, in consideration of workability at the time of assembly described above, it is a common practice to adopt a configuration in which, as in the comparative example illustrated in FIG. 4, when viewed from the axial direction, the tooth top circle of the input-side intermediate gear 31 and the radially outer circle of the bearing 48 do not have the intersection point and the tooth top circle of the final output gear 35 and the radially outer surface of the bearing 45 do not have the intersection point. The present invention gives focus on the fact that, even when the assembly workability is somewhat sacrificed, such disadvantage can easily be eliminated. The configuration described above is adopted to achieve reduction in radial dimension of the in-wheel motor drive device 21. For achievement of downsizing of the in-wheel motor drive device 21, assembly workability is considered as a matter subjected to a trade-off. In this regard, the present invention involves a novel idea different from existing means for downsizing.

In the description of the embodiment above, there is exemplified the electric motor 26 of a radial gap type as the motor section A. However, a motor having any other configuration may be adopted. For example, there may be adopted an electric motor of an axial gap type, comprising a stator fixed to a casing and a rotor arranged so as to be opposed with a gap to the stator on an inner side in the axial direction. Moreover, there is exemplified the case in which the parallel shaft speed reducer 39 with two-stage speed reduction is used. However, the present invention is not limited to be applied to such configuration, and may be similarly applied to a speed reducer configured to perform speed reduction with three or more stages.

Further, in the description described above, there is given a case in which electric power is supplied to the motor section A to drive the motor section and the power from the motor section A is transmitted to the rear wheels 14. Conversely to this, however, when a vehicle decelerates or descends a slope, the power from the rear wheel 14 side may be converted at the speed reducer section B into high-rotation low-torque rotation so that the rotation is transmitted to the motor section A for electric power generation in the motor section A. Further, the electric power generated in the motor section A may be stored in a battery so that the electric power is used to drive the motor section A later or to operate other electric devices equipped in the vehicle.

Moreover, in the embodiment described above, as illustrated in FIG. 6 and FIG. 7, there is exemplified the electric vehicle 11 comprising the rear wheels 14 as driving wheels. However, the electric vehicle 11 may comprise the front wheels 13 as driving wheels, or may be a four-wheel drive vehicle. In the "electric vehicle" herein encompasses all automobiles configured to obtain a driving force from the electric power, and thus may include, for example, a hybrid car.

The present invention is not limited to the above-mentioned embodiment. As a matter of course, the present invention may be carried out in various modes without departing from the gist of the present invention. The scope of the present invention is defined in the scope of claims, and encompasses equivalents described in claims and all changes within the scope of claims.

REFERENCE SIGNS LIST 21 in-wheel motor drive device
25 motor rotation shaft
30 input gear
30a input shaft
31 input-side intermediate gear (large gear)
32 output-side intermediate gear (small gear)
35 final output gear
36 output shaft
39 parallel shaft gear speed reducer
45 rolling bearing
48 rolling bearing
A electric motor section
B speed reducer section
C wheel bearing section
S1 intermediate shaft

The invention claimed is:

1. An in-wheel motor drive device, comprising:
an electric motor section;
a wheel bearing section; and
a speed reducer section, which is formed of a parallel shaft gear mechanism comprising an input shaft, an intermediate shaft, and an output shaft, and is configured to transmit output torque of the electric motor section, which is input to the input shaft, to the wheel bearing section via the intermediate shaft and the output shaft,
the intermediate shaft comprising a large gear and a small gear,
the output shaft comprising a final output gear configured to mesh with the small gear of the intermediate shaft,
the output shaft being supported on its in-board side and out-board side by bearings, respectively,
wherein the large gear of the intermediate shaft is arranged between the bearing configured to support the output shaft on the in-board side and the final output gear of the output shaft, and
wherein, when viewed from the axial direction, a tooth top circle of the large gear of the intermediate shaft and a radially outer circle of the bearing configured to support the output shaft on the in-board side have an intersection point.

2. The in-wheel motor drive device according to claim 1, wherein the intermediate shaft is supported on its in-board side and out-board side by bearings, respectively,
wherein the final output gear is arranged between the bearing configured to support the intermediate shaft on the out-board side and the large gear of the intermediate shaft, and
wherein, when viewed from the axial direction, the tooth top circle of the final output gear of the output shaft and the radially outer circle of the bearing configured to support the intermediate shaft on the out-board side have an intersection point.

* * * * *